United States Patent Office.

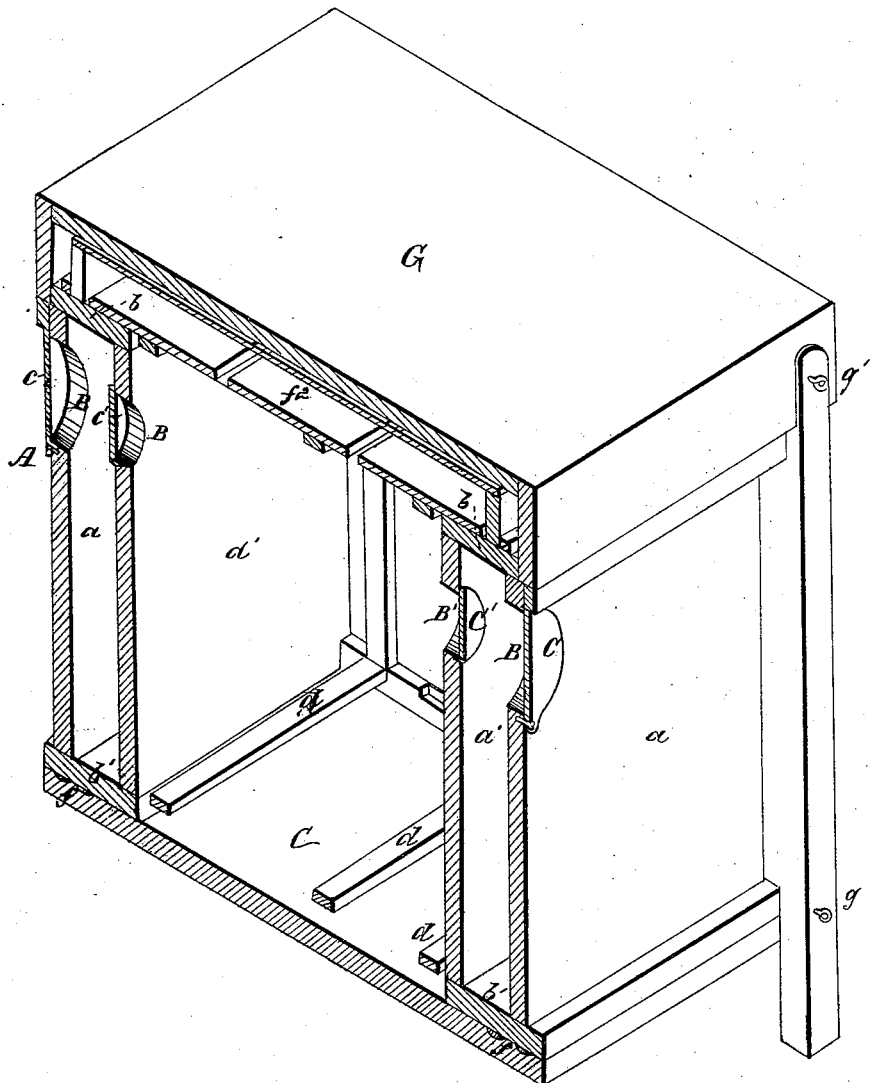

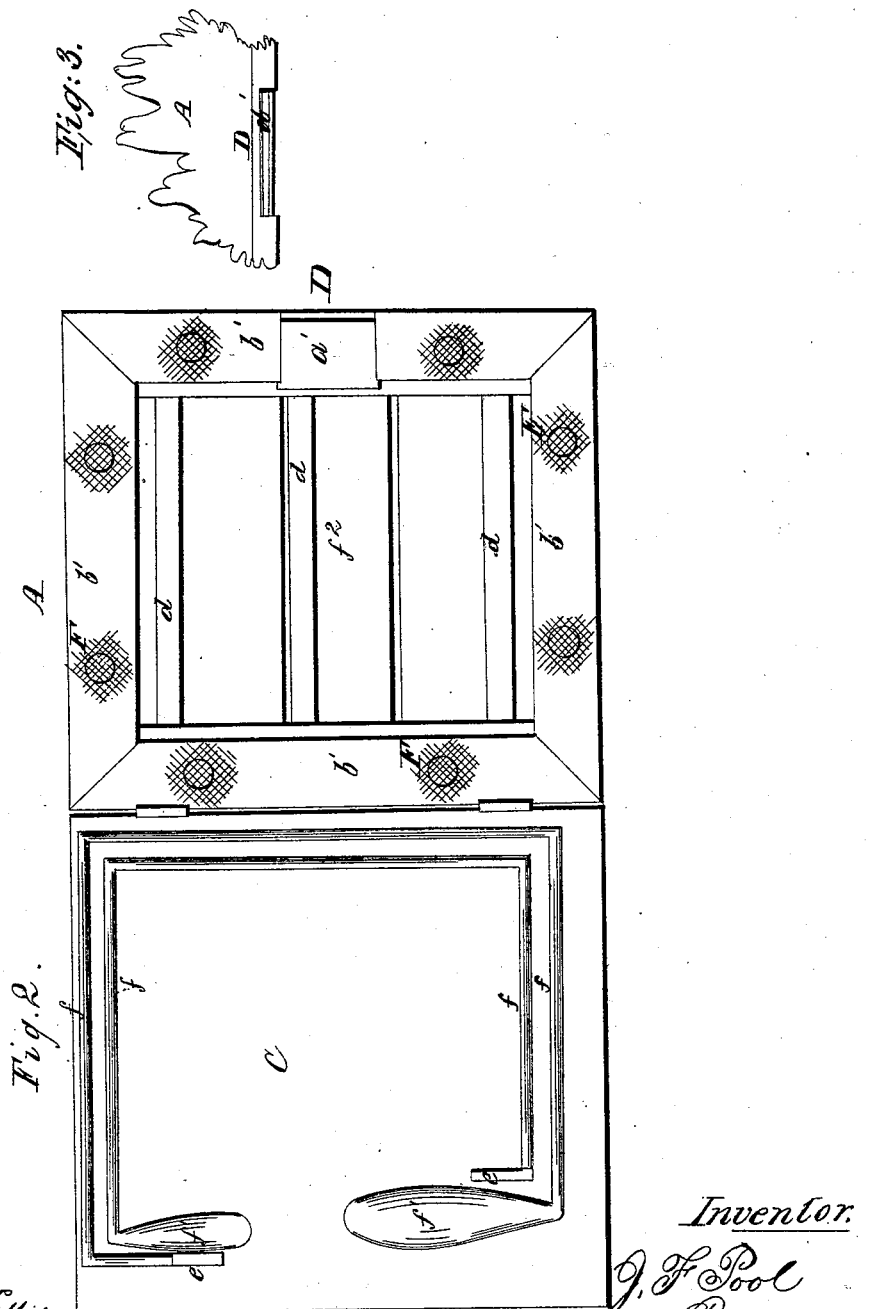

J. F. POOL, OF MONROE, WISCONSIN.

Letters Patent No. 81,206, dated August 18, 1868.

---

IMPROVEMENT IN BEE-HIVES.

---

The Schedule referred to in these Letters Patent and making part of the same.

---

TO ALL WHOM IT MAY CONCERN:

Be it known that I, J. F. POOL, of Monroe, in the county of Green, and State of Wisconsin, have invented certain new and useful Improvements in Bee-Hives; and I do hereby declare that the following is a full, clear, and exact description thereof, reference being had to the accompanying drawings, and to the letters of reference marked thereon, which form a part of this specification. In Figure 1 is represented a perspective section of my hive, Figure 2 an inverted view of the hive and its hinged bottom, and Figure 3 is a view of the entrance to the hive for the bees.

The nature of my invention consists in the employment of a hinged bottom, provided with adjusting-holes, and constructed substantially as will be hereinafter described; the mode of constructing the entrance to the hive for the bees and the miller, and the manner of ventilating the same; providing the hive with an inner and outer wall; and, finally, furnishing it with an adjustable or removable top or roof, substantially as hereinafter set forth.

To enable those skilled in the art to make and use my invention, I will now describe its construction and operation.

In the accompanying drawings, A represents the casing or frame, which consists of the inner wall $a'$ and outer wall $a$, connected at top and bottom by the pieces $b$ $b'$.

B and B' designate ventilating-holes, the holes B being situated in the upper portion of the sides of the wall $a$ of casing A, and provided with hinged lids $c$ $c$, and the holes B' are situated in the inner walls $a'$, directly opposite the holes B, and made a little smaller than the holes B. The holes B' are also furnished with lids, $c'$, on their outer surface, and covered on their inner surface with wire gauze.

$d$ $d$ designate a number of frames, resting at their lower ends in slots or recesses cut in rails secured to the lower inner sides of wall $a'$, and resting at their opposite ends in grooves or slots made in the upper part of the wall $a'$ of the hive.

C designates the hinged bottom, constructed or cut with two sets of grooves or depressions, $f$, extending the entire length and breadth of the bottom, saving a small portion of its surface directly below the mouth of the hive, or nearly so, and terminating there at each end in a depression alternately, their other ends terminating in recesses or holes $e$ $e$. The depressions into which the alternate ends of grooves $f$ terminate, I term moth-beds, $f^1$.

$g$ designates adjusting-pins, only one of which is shown, for allowing the bottom to be opened or lowered at one end, when desired, the front posts being provided with a number of holes for that purpose.

D is the mouth or opening, situated in the lower front part of the hive, for the entrance of the bees thereto. This opening is cut or provided on each side with grooves inclining inwards, into which slides a metal plate, $d'$, as shown in fig. 3.

It is designed that the miller should enter the opening below $d'$, and the bees that part of the opening above plate $d'$.

F designates another set of ventilating-holes, made in the lower part of the hive, and allowing air to pass up between the inner and outer walls of said hive, and having their outer surfaces covered with wire gauze, and facing the grooves or depressions $f$ in the bottom, C, thus thoroughly ventilating the hive.

$f^2$ is the honey-box, which is furnished with a slatted bottom, and situated on the top of frames $d$.

G represents the top or roof of the hive, which is made removable or adjustable, and secured in place by means of keys or pins $g'$.

What I claim as new, and desire to secure by Letters Patent, is—

The hive, constructed with walls $a$ $a'$, hinged bottom C, ventilating-holes B B' F F', and opening or entrance D, all arranged substantially as and for the purpose set forth.

In testimony that I claim the foregoing as my own, I affix my signature in presence of two witnesses.

J. F. POOL.

Witnesses:
S. W. ABBOTT,
W. H. PIERCE.